United States Patent
Kingdon et al.

(10) Patent No.: US 6,411,811 B2
(45) Date of Patent: *Jun. 25, 2002

(54) SYSTEM AND METHOD FOR PROVISIONING ASSISTANCE GLOBAL POSITIONING SYSTEM INFORMATION TO A MOBILE STATION

(75) Inventors: Christopher H. Kingdon, Garland; Bagher R. Zadeh, Dallas; Jan Lennert Kransmo, Plano, all of TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,028

(22) Filed: Apr. 20, 1998

(51) Int. Cl.⁷ .................................................. H04Q 7/20
(52) U.S. Cl. .................. 455/456; 455/427; 342/357.03; 701/215
(58) Field of Search ................................ 455/427, 429, 455/456, 12.1, 457, 357.03; 342/357.03, 357.1; 701/215

(56) References Cited

U.S. PATENT DOCUMENTS

| | | | |
|---|---|---|---|
| 5,119,102 A | * 6/1992 | Barnard | 342/357 |
| 5,323,322 A | * 6/1994 | Mueller et al. | 364/449 |
| 5,430,657 A | * 7/1995 | Kyrtsos | 364/459 |
| 5,528,247 A | * 6/1996 | Nonami | 342/357 |
| 5,587,716 A | * 12/1996 | Sheynblat | 342/357 |
| 5,617,100 A | * 4/1997 | Akiyoshi et al. | 342/357 |
| 5,724,660 A | * 3/1998 | Kauser et al. | 455/456 |
| 5,815,814 A | * 9/1998 | Dennison et al. | 455/456 |
| 5,818,385 A | * 10/1998 | Bartholomew | 342/372 |
| 5,917,444 A | * 6/1999 | Loomis et al. | 342/357 |

FOREIGN PATENT DOCUMENTS

| | | | |
|---|---|---|---|
| GB | 2 264 837 A | * 2/1993 | ............. G01S/5/14 |
| GB | 2 308 033 A | 6/1997 | |

OTHER PUBLICATIONS

PCT International Search Report dated Sep. 15, 1999.

* cited by examiner

*Primary Examiner*—Lee Nguyen
*Assistant Examiner*—Simon Nguyen
(74) *Attorney, Agent, or Firm*—Jenkens & Gilchrist, P.C.

(57) ABSTRACT

A telecommunications system and method is disclosed for provisioning assistance Global Position System (GPS) data to a GPS receiver within a mobile terminal. This can be accomplished by having multiple reference GPS receivers located throughout a cellular network, each reference GPS receiver being capable of providing locally valid lists of visible satellites and the associated ephemeris and clock correction information. The location of the Base Transceiver Station (BTS) within the cell that the mobile terminal with a built-in or attached GPS receiver is currently located in can be used as the local position estimate for that mobile terminal. From this local position estimate, the nearest reference GPS receiver can be ascertained and the relevant assistance data can then be sent to the GPS receiver within the mobile terminal through the cellular network to enable the built-in GPS receiver to calculate its position relatively quickly.

18 Claims, 3 Drawing Sheets

SYSTEM AND METHOD FOR PROVISIONING ASSISTANCE GLOBAL POSITIONING SYSTEM INFORMATION TO A MOBILE STATION

BACKGROUND OF THE PRESENT INVENTION

1. Field of the Invention

The present invention relates generally to telecommunications systems and methods for implementing Global Positioning System (GPS) receivers within mobile terminals, and specifically to provisioning GPS assistance information to GPS receivers within or attached to mobile terminals.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., Where am I service.

One known solution of locating an object is the Global Positioning System (GPS). GPS is a well-known technology used by many military and civilian applications. It is based upon a constellation of satellites launched by the U.S. government beginning in 1978. The GPS satellites transmit the standard positioning service (SPS) signal, which is available for civilian applications, on a 1575.42 MegaHertz carrier. Each satellite uses a unique 1023-chip Gold code at a rate of 1.023 MegaHertz, such that all codes repeat at 1 millisecond intervals.

Each satellite also transmits a unique 50 bit/second navigation message containing parameters that allow GPS receivers on earth to compute a precise position solution. The navigation message includes a precise time reference as well as parameters that precisely describe the orbital positions and clock corrections for the satellites. In general, GPS receivers compute a position solution by searching for all visible satellites, which can be accomplished by correlating the received signal with replicas of the respective Gold codes, demodulating the navigation message of each visible satellite to obtain a time reference and orbital position, computing a range estimate for each visible satellite that includes the GPS receiver clock uncertainty, and, if at least four satellites are visible, computing the GPS receiver position and clock correction using the range estimate.

The duration of the GPS positioning process is directly dependent upon how much information the GPS receiver has. Most GPS receivers are programmed with almanac data, which coarsely describes the satellite positions for one year. However, if the GPS receiver does not have some knowledge of its own approximate location, then the GPS receiver cannot correlate signals from the visible satellites quickly, and therefore, cannot calculate its position quickly. Thus, in order to implement a GPS receiver effectively within a mobile terminal 20, in order to meet demands for expedited and accurate positioning, e.g., FCC phase II E-911 service, there must be some way to provide this type of accurate assistance data, e.g., local time and position estimates and satellite ephemeris and clock information, which varies according to the MS 20 location, to the GPS receiver within or attached to the MS 20 quickly.

It is, therefore, an object of the present invention to send the necessary assistance GPS information over the existing wireless network to the GPS receiver within the mobile terminal.

SUMMARY OF THE INVENTION

The present invention is directed to telecommunications systems and methods for provisioning assistance Global Position System (GPS) data to a GPS receiver within a mobile terminal. This can be accomplished by having multiple reference GPS receivers located throughout the cellular network, each reference GPS receiver being capable of providing locally valid lists of visible satellites and the associated ephemeris and clock correction information. This data from each reference GPS receiver is valid for a radius of up to 300 kilometers around the reference GPS receiver site. However, if a differential GPS solution is utilized, the data for the GPS receiver is only valid for a radius of up to 50 kilometers. The location of the Base Transceiver Station within the cell that the mobile terminal with a built-in GPS receiver is currently located in can be used as the local position estimate for that mobile terminal. From this local position estimate, the nearest reference GPS receiver can be ascertained and the relevant assistance data can then be sent to the GPS receiver within the mobile terminal through the cellular network to enable the built-in GPS receiver to calculate its position relatively quickly. Advantageously, compared with previous solutions, the accuracy of the position of the mobile terminal using a GPS receiver can be reduced to a 5 meter radius (using differential correction information), instead of a cell radius (500 meters to 35 kilometers) or a location area radius, as in previous solutions.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
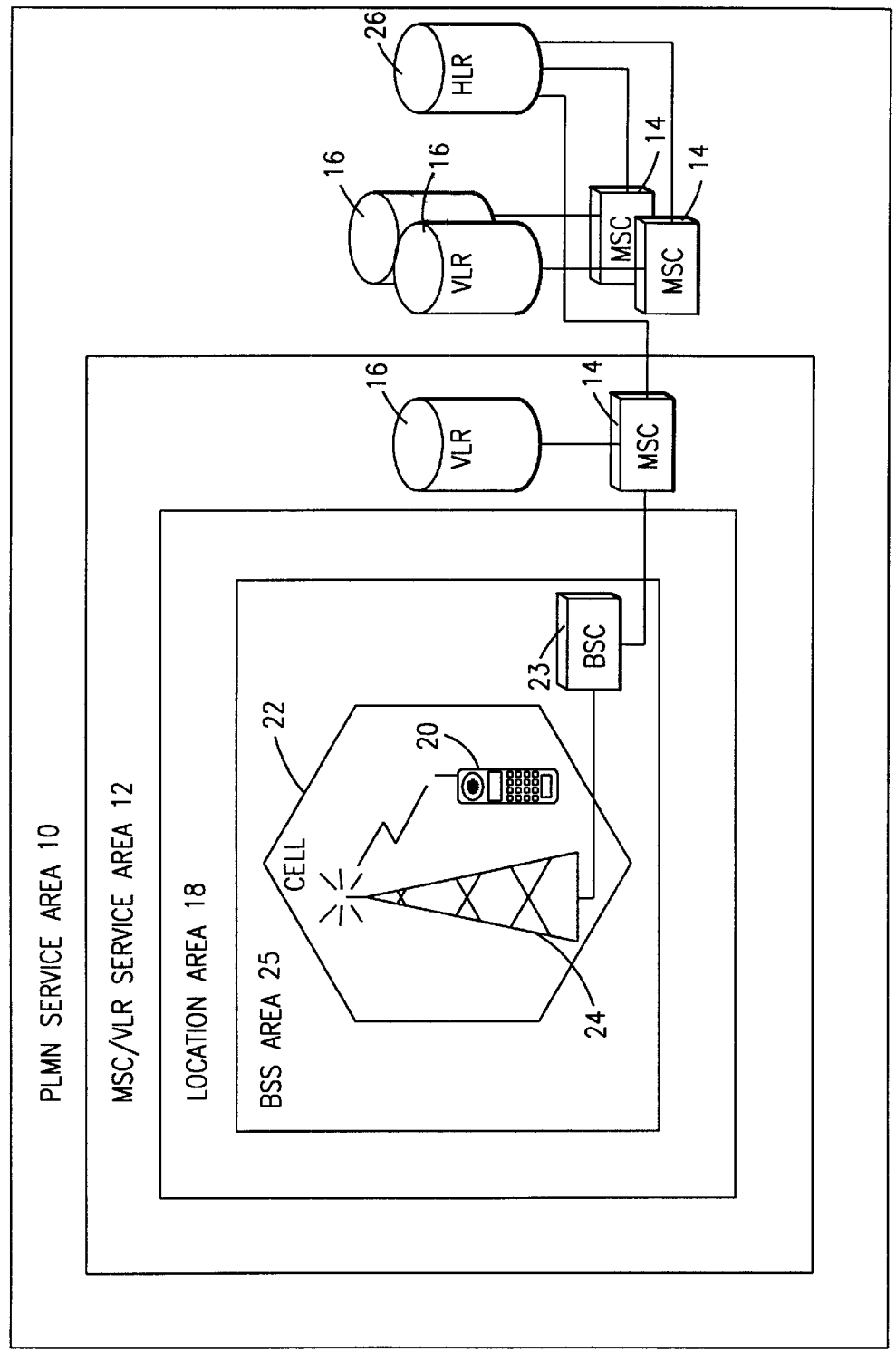
FIG. 1 is a block diagram of a conventional terrestrially-based wireless telecommunications system.
Figure 2:
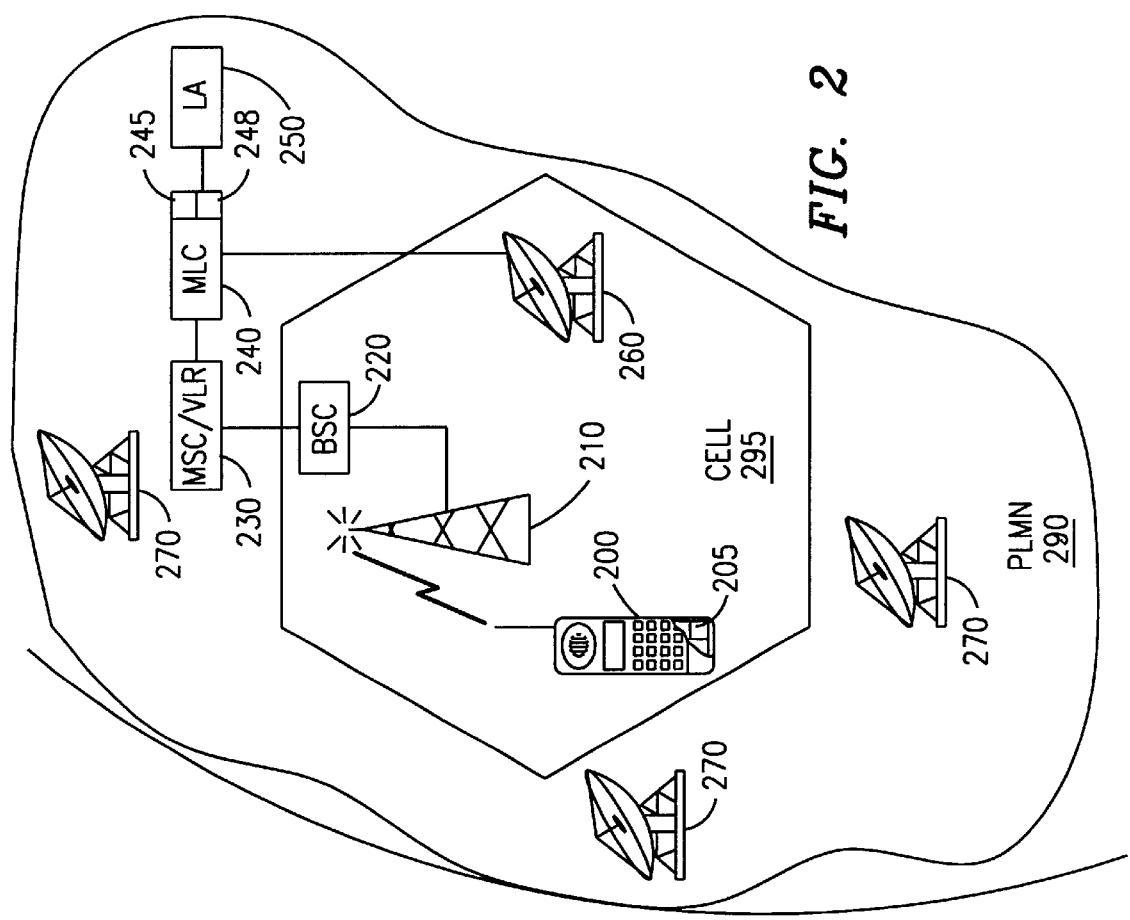
FIG. 2 illustrates positioning of a mobile terminal within a cellular network using the Global Positioning System (GPS) in accordance with preferred embodiments of the present invention.
Figure 2:
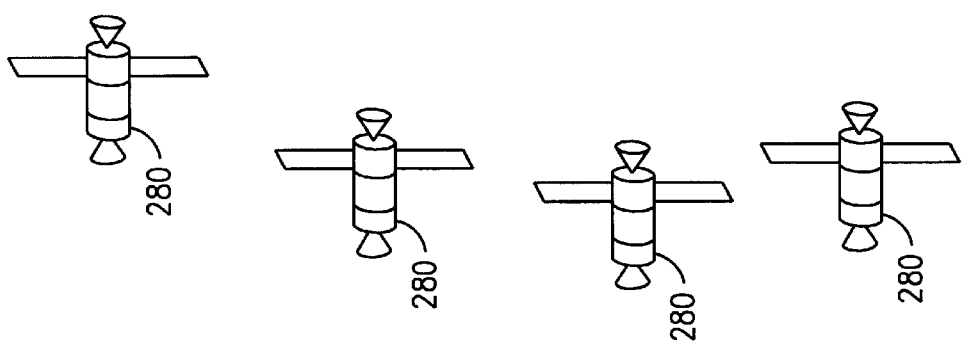
Figure 3:
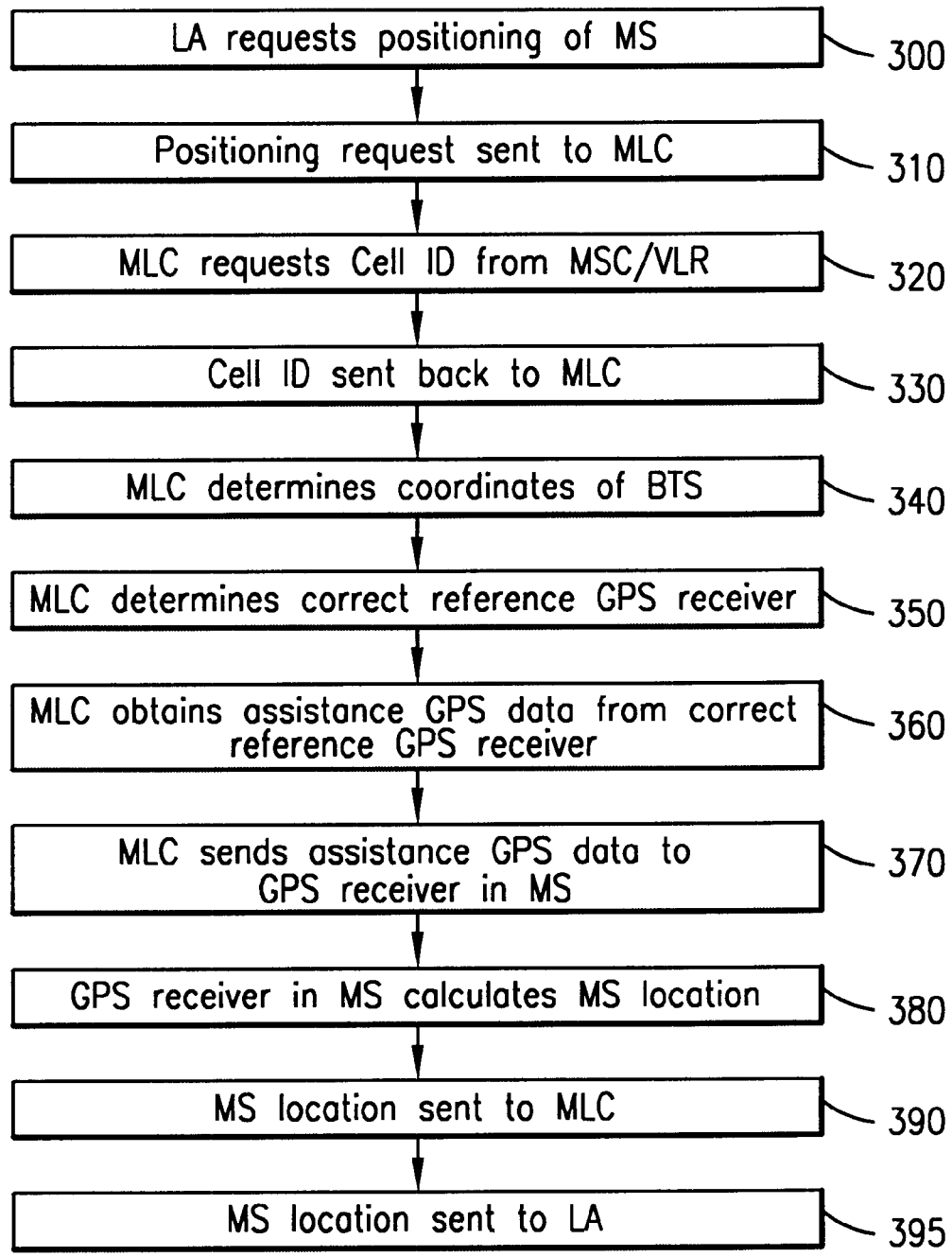
FIG. 3 demonstrates steps in a sample positioning of a mobile terminal using GPS in accordance with preferred embodiments of the present invention.

With reference now to FIG. 2 of the drawings, which will be described in connection with FIG. 3 of the drawings, when a requesting Location Application (LA) 250 requests positioning of a Mobile Station (MS) 200 within a Public Land Mobile Network (PLMN) 290 (step 300), the positioning request is forwarded to a Mobile Location Center 240 serving the PLMN 290 (step 310). It should be noted that the LA 250 can be an external node, within the cellular PLMN network 290, or within the MS 200 itself. Thereafter, the MLC 240 requests, from a Mobile Switching Center/ Visitor Location Register (MSC/VLR) 230 serving the area that the MS 200 is in, the cell ID corresponding to a cell 295 that the MS 200 is currently located in (step 320). If the MS 200 is in idle mode, e.g., not in use, the MLC 240 can then instruct the MSC/VLR 230 to page the MS 200 via a Base Station Controller (BSC) 220 and a serving Base Transceiver Station (BTS) 210 to determine the cell ID for the cell 295 that the MS 200 is located in (step 320). This cell ID is then sent back to the MLC 240 from the MSC/VLR 230 (step 330). If, however, the MS 200 is in busy mode, e.g., in use, the cell ID information is already known by the MSC/VLR 230 (step 320) and is sent by the MSC/VLR 230 to the MLC 240 (step 330), upon request.

Once the MLC 240 receives the cell ID from the MSC/VLR 230 (step 330), the MLC 240 can determine the coordinates of the serving BTS 210 (step 340), which preferably serves as the local position estimate for the MS 200, and from this information, using, for example, a look-up table 245, the MLC 240 can determine a reference GPS receiver 260 (step 350), which is valid for the cell 295 that the MS 200 is located in. Alternatively, the MLC 240 can determine the correct reference GPS receiver 260 (step 350) just from the cell ID, using another look-up table 245. In addition, alternative ways of determining the correct reference GPS receiver 260 (step 350) can be used instead of the look-up table 245 described herein. Alternatively, certain countries may have regulations against transmitting cell-site location information. In this case, the local position estimate can be quantized to approximately 1 kilometer granularity, which can then be used to determine the correct reference GPS receiver 260 (step 350).

Multiple reference GPS receivers 260 and 270 are spaced throughout the PLMN 290 in order to provide accurate assistance GPS data to GPS receivers 205 within or attached to MS's 200. This data is used by the built-in GPS receiver 205 to determine the location of the MS 200 within the PLMN 290. The data in each reference GPS receiver 260 and 270 is valid in a radius of up to 300 kilometers around the reference GPS receiver 260 and 270 site (except for differential correction information, which is only valid for a radius of up to 50 kilometers), and therefore, the correct reference GPS receiver 260 for the cell 295 that the MS 200 is in must be determined to ensure the accuracy of the assistance GPS data. In addition, each reference GPS receiver 260 and 270 must be placed such that the antenna has an unobstructed view of the full sky.

After the MLC 240 has determined the correct reference GPS receiver 260 (step 350), the MLC 240 then obtains, from the reference GPS receiver 260, the relevant assistance GPS data (step 360), such as the identity of the visible satellites 280, the orbital parameters of the satellites 280, clock corrections and differential corrections. A current requirement is that this assistance data to be updated by the reference GPS receivers 260 and 270 about every thirty minutes (except for differential corrections, which are updated about every five seconds).

In alternative embodiments, the differential corrections can be sent from the correct reference GPS receiver 260 to the MLC 240 and then be forwarded to the serving BTS 210 for that cell 295 to be broadcast on, for example, a Broadcast Control Channel (BCCH), to MS's 200 within the cell 295 about every five seconds. Therefore, this information does not need to be collected by the MLC 240 when a positioning request comes in and then subsequently sent to the MS 200 to be positioned, which could take more than five seconds. Advantageously, by continuously broadcasting the differential corrections every five seconds, the MS 200 will always have updated differential correction information.

The MLC 240 can collect the assistance GPS data (step 360) by querying the correct reference GPS receiver 260 for the latest assistance GPS data when a positioning request comes in. Alternatively, each reference GPS receiver 260 and 270 within the PLMN 290 can update the MLC 240, e.g., every thirty minutes, and store, within a database 248 within the MLC 240, the current assistance GPS data for that reference GPS receiver 260 and 270. Thus, when a positioning request comes in, the MLC 240 need only access that stored information associated with the correct reference GPS receiver 260 when the correct reference GPS receiver 260 is ascertained (step 350). In either case, once the current assistance GPS data is obtained by the MLC 240 (step 360), this information is forwarded to the built-in or attached GPS receiver 205 within the MS 200 (step 370) via the MSC/VLR 230, BSC 220 and BTS 210. For example, the current assistance data can be sent to the MS 200 (step 370) within a Short Message Service (SMS) message.

Using this assistance GPS data, the built-in GPS receiver 205 within the MS 200 can calculate its position (step 380), e.g., latitude and longitude, and send this location information back to the MLC 240 (step 390), in, for example, an SMS message. Thereafter, the MLC 240 can forward the location of the MS 200 to the requesting Location Application (LA) 250 (step 395).

Advantageously, by providing the MS 200 with an integrated GPS receiver 205 and the necessary assistance GPS data, the integrated GPS receiver 205 can calculate its position (step 380) relatively quickly. Without this information, a GPS receiver 270 typically requires approximately 15 seconds to 30 minutes. However, with the provisioning of the assistance GPS data to the GPS receiver 205 within the MS 200 through the cellular network 290 (step 370), positioning (step 380) can potentially be performed within about 5 seconds. In addition, the accuracy of the MS 200 location can be improved to a radius of about 5 meters with the differential correction information, instead of the radius of a cell (500 m to 35 km radius) or a location area, as in previous solutions.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for providing correct Global Positioning System assistance data to a mobile terminal within a cellular network, said mobile terminal having a Global Positioning System receiver connected thereto, said telecommunications system comprising:

a plurality of reference Global Positioning System receivers, each of said reference Global Positioning System receivers being adapted to receive respective Global Positioning System assistance data; and a mobile location center connected to said reference Global Positioning System receivers and in wireless communication with said mobile terminal, said mobile location center being adapted to determine a correct one of reference Global Positioning System receivers for said mobile terminal, receive only said correct Global Positioning System assistance data from only said correct reference Global Positioning System receiver and transmit said correct Global Positioning System assistance data to said Global Positioning System receiver connected to said mobile terminal for use by said Global Positioning System receiver connected to said mobile terminal in the calculation of the location of said mobile terminal.

2. The telecommunications system of claim 1, wherein said mobile terminal is located within a cell in said cellular network, said cell having a cell ID associated therewith, said mobile location center determining said correct reference Global Positioning System receiver using said cell ID.

3. The telecommunications system of claim 2, wherein said mobile location center has a list of coordinates stored therein, each of said coordinates having an associated one of said reference Global Positioning System receivers, said mobile location center finding a correct one of said coordinates within said list of coordinates, using said cell ID, said correct reference Global Positioning System receiver being said reference Global Positioning System receiver associated with said correct coordinates.

4. The telecommunications system of claim 3, further comprising a base station in wireless communication with said mobile terminal and in communication with said mobile location center, said correct coordinates being associated with the location of said base station.

5. The telecommunications system of claim 1, wherein said mobile location center determines said correct reference Global Positioning System receiver when said mobile location center receives a positioning request from a location node.

6. The telecommunications system of claim 5, wherein the location of said mobile terminal is sent from said mobile terminal to said location node.

7. The telecommunications system of claim 1, wherein said correct assistance data is sent from said mobile location center to said Global Positioning System receiver connected to said mobile terminal via a mobile switching center connected to said mobile location center, and a base station connected to said mobile switching center and in wireless communication with said mobile terminal, said Global Positioning System receiver being located within said mobile terminal.

8. The telecommunications system of claim 1, wherein said correct assistance data is sent to said Global Positioning System receiver connected to said mobile terminal in a Short Message Service message, the location of said mobile terminal being sent from said moible terminal to said mobile location center in an additional Short Message Service message.

9. The telecommunications system of claim 1, wherein said assistance data comprises the number of visible satellites, the orbital parameters associated with each said visible satellite, clock correction information and differential correction information.

10. A method for providing correct Global Positioning System assistance data to a mobile terminal within a cellular network, said mobile terminal having a Global Positioning System receiver connected thereto, said method comprising the steps of:

determining, by a mobile location center connected to a plurality of reference Global Positioning System receiver and in wireless communication with said mobile terminal, a correct one of said reference Global Positioning System receivers for said mobile terminal, each of said reference Global Positoning System receivers being adapted to receive respective Global Positioning System assistance data;

receiving only said correct Global Positioning System assistance data from only said correct reference Global Positioning System receiver at said mobile location center;

sending said correct Global Positioning System assistance data from said mobile location center to said Global Positioning System receiver connected to said mobile terminal; and calculating, by said Global Positioning System receiver connected to said mobile terminal, the location of said mobile terminal, using said received correct Global Positioning assistance data.

11. The method of claim 10, wherein said mobile terminal is located within a cell in said cellular network, said cell having a cell ID associated therewith, said step of determining said correct reference Global Positioning System receiver being performed using said cell ID.

12. The method of claim 11, wherein said mobile location center has a list of coordinates stored therein, each of said coordinates having an associated one of said reference Global Positioning System receivers, said step of determining said correct reference Global Positioning System receiver being performed by said mobile location center finding a correct one of said coordinates within said list of coordinates, using said cell ID, said correct reference Global Positioning System receiver being said reference Global Positioning System receiver associated with said correct coordinates.

13. The method of claim 12, wherein said correct coordinates are associated with the location of a base station in wireless communication with said mobile terminal and in communication with said mobile location center.

14. The method of claim 10, further comprising, before said step of determining said correct reference Global Positioning System receiver, the step of:

receiving, by said mobile location center, a positioning request from a location node.

15. The method of claim 14, further comprising, after said step of calculating, the steps of:

sending, by said mobile terminal, the location of said mobile terminal to said mobile location center; and sending, by said mobile location center, the location of said mobile terminal to said location node.

16. The method of claim 10, wherein said step of sending said correct assistance data from said mobile location center to said Global Positioning System receiver connected to said mobile terminal is performed by sending said correct assistance data via a mobile switching center connected to said mobile location center, and a base station connected to said mobile switching center and in wireless communication with said mobile terminal, said Global Positioning System receiver being located within said mobile terminal.

17. The method of claim 10, wherein said step of sending said correct assistance data to said Global Positioning System receiver connected to said mobile terminal is performed by sending said correct assistance data in a Short Message Service message, and further comprising, after said step of calculating, the step of:

sending, by said mobile terminal, the location of said mobile terminal to said mobile location center in an additional Short Message Service message.

18. The method of claim 10, wherein said assistance data comprises the number of visible satellites, the orbital parameters associated with each said visible satellite, clock correction information and differential correction information.

* * * * *

UNITED STATES PATENT AND TRADEMARK OFFICE
CERTIFICATE OF CORRECTION

PATENT NO.    : 6,411,811 B2                                           Page 1 of 1
DATED         : June 25, 2002
INVENTOR(S)   : Christopher H. Kingdon et al.

It is certified that error appears in the above-identified patent and that said Letters Patent is hereby corrected as shown below:

Title page,
Item [56], References Cited, FOREIGN PATENT DOCUMENTS,
Add: -- DE 44 24 412 --

Column 6,
Line 2, replace "one of reference Global" with -- one of said reference Global --
Line 67, replace "receiver" with -- receivers --

Column 7,
Line 3, replace "Positoning" with -- Positioning --
Line 17, replace "Positioning assistance data" with -- Positioning System assistance data --

Signed and Sealed this

Twelfth Day of November, 2002

*Attest:*

*Attesting Officer*

JAMES E. ROGAN
*Director of the United States Patent and Trademark Office*